(12) United States Patent
Thomas et al.

(10) Patent No.: US 6,212,385 B1
(45) Date of Patent: Apr. 3, 2001

(54) CELLULAR COMMUNICATION SYSTEM AND RE-USE PATTERN THEREFOR

(75) Inventors: Howard Thomas, Cirencester; Jun Xiang, Bassett; Simon Saunders, Guildford, all of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/091,028

(22) PCT Filed: Nov. 21, 1996

(86) PCT No.: PCT/EP96/05137

§ 371 Date: Mar. 29, 1999

§ 102(e) Date: Mar. 29, 1999

(87) PCT Pub. No.: WO97/22222

PCT Pub. Date: Jun. 19, 1997

(30) Foreign Application Priority Data

Dec. 11, 1995 (GB) .................................................. 9525268

(51) Int. Cl.[7] ....................................................... H04Q 7/36
(52) U.S. Cl. ........................... 455/447; 455/450; 455/449; 370/329
(58) Field of Search ................................... 455/456, 447, 455/452, 450, 453, 449; 370/329, 334

(56) References Cited

U.S. PATENT DOCUMENTS

| | | | | |
|---|---|---|---|---|
| 4,128,740 | * | 12/1978 | Graziano | 455/456 |
| 4,144,411 | * | 3/1979 | Frenkiel | 455/447 |
| 5,230,081 | * | 7/1993 | Yamada et al. | 455/456 |
| 5,257,398 | * | 10/1993 | Schaeffer | 455/452 |
| 5,483,667 | * | 1/1996 | Faruque | 455/447 |
| 5,537,682 | * | 7/1996 | Miller | 455/447 |

FOREIGN PATENT DOCUMENTS

WO 91/13521    9/1991    (WO) .

OTHER PUBLICATIONS

Proceedings of the Fourth Nordic Seminar on Digital Land Mobile Radio Communications (DMR IV), Oslo, No. 26–28, Jun. 1990.
Toshihito Kanai et al. "Radio Link Design for Sector Cell".

\* cited by examiner

*Primary Examiner*—Edward F. Urban
*Assistant Examiner*—Isaak R. Jama
(74) *Attorney, Agent, or Firm*—Heather L. Creps

(57) ABSTRACT

A cellular communication system has a frequency bandwidth arranged into a plurality of frequency channels, and a plurality of neighbouring first (130) and second (132) sites each having sectors (a1–f1, a2–f2) containing at least one frequency channel. Corresponding sectors in each of the neighbouring first (130) and second sites (132) have consecutive frequency channels from the frequency bandwidth, thereby producing a two-site re-use pattern (134, 136). The cellular communication system may be adapted to support an underlay/overlay cell configuration in which neighbouring first (230) and second (232) sites each have six-sectors containing at least one frequency channel (b1–b12) of a two-site repeat pattern. The six sectors further each contain at least one frequency channel (t1–t6) of a one-site repeat pattern. Corresponding sectors in each of the neighbouring first (130) and second (132) sites have consecutive frequency channels in the two-site repeat pattern and identical channels in the one-side repeat pattern.

14 Claims, 6 Drawing Sheets

CELLULAR COMMUNICATION SYSTEM AND RE-USE PATTERN THEREFOR

BACKGROUND OF THE INVENTION

This invention relates, in general, to a cellular communication system and is particularly, but not exclusively, applicable to a repeat (or re-use) pattern for such cellular communication system. More particularly, an aspect of the present invention may be employed in a cellular communication system having concentric cells.

SUMMARY OF THE PRIOR ART

As a consequence of the limited availability of frequency bandwidth for cellular communication systems generally, such as the pan-European Global System for Mobile (GSM) cellular communication, designers must employ frequency re-use techniques to optimise and increase cellular system capacity. More explicitly, a frequency bandwidth that is assigned to the communication system is divided into many channels that are themselves attributed to frequency groups. These frequency groups are then individually allocated to sectors that form a site (or cell), with the deployment of one set of frequency groups across many sites defining a cluster of sites within the communication system. As such, cell planning represents the distribution of frequency groups between a number of sectors in a cluster, while a repeat (or re-use) pattern for the system is indicated by the relationship between the number of sites that are covered by an integer number of sets of frequency groups. For example, a repeat pattern of two (2) would be achieved from the deployment of two complete sets of frequency groups to cover a cluster containing 4 sites (with each site typically containing either three (3) or six (6) sectors).

To date, repeat patterns offering a two-site repeat have proved difficult to implement because of co-channel interference and, in particular, considerable adjacent channel interference (or splatter) prevalent in current repeat patterns. In these respects and as will be understood, co-channel interference occurs when different sectors use the same frequency groups (with an intensity for the co-channel interference determined by the proximity and number of co-channel cells), whereas adjacent channel interference occurs as a result of the adjacent location of contiguous frequency bands (channels). Clearly, in a two-site repeat pattern, adjacent channel interference becomes an increasing problem.

At present, therefore, many systems (including GSM and Digital Communication System (DCS) 1800) utilise a single-layer four-site repeat pattern.

In an attempt to mitigate against the effects of adjacent channel interference in a two-site repeat pattern, "frequency hopping" schemes (such as envisaged in Code Division Multiple Access (CDMA)) offer a potential solution to the problem, although such schemes are relatively complex and commercially expensive (because of the necessity for sophisticated hand-over algorithms and the increased complexity of system infrastructure). As such, allocation of frequency groups to sectors may be on either a permanent or initial basis.

Furthermore, in an endeavour to optimise cellular systems still further, designers have recently begun to experiment with concentric cell arrangements in which a first set of frequencies having a first repeat pattern is over-layed by a second set of frequencies having a second repeat pattern. In this respect, systems have emerged that provide a four-site (by three-sector) repeat pattern with a one-site (by three sector) underlay/overlay, notwithstanding that the use of a one-site repeat pattern for a site having three sectors inherently produces adjacent channel interference (or splatter) in the one-site repeat pattern (that is potentially unacceptable to network operators).

SUMMARY OF THE INVENTION

According to a first aspect of the present invention there is provided a cellular communication system having a frequency bandwidth arranged into a plurality of frequency channels, the cellular communication system comprising neighbouring first and second sites each having sectors containing at least one frequency channel, wherein corresponding sectors in each of the neighbouring first and second site have consecutive frequency channels from the frequency bandwidth, thereby producing a two-site re-use pattern.

In a preferred embodiment, neighbouring sectors within both the first and second sites observe a next but one frequency channel relationship with adjacent frequency channels in at least one neighbouring sector.

Indeed, by providing clusters having corner illuminated, six-sectored sites, the preferred embodiment of the present invention provides a two-site repeat pattern that avoids adjacent channels and hence adjacent channel splatter.

In another preferred embodiment that supports an underlay/overlay cell configuration, the frequency bandwidth is arranged into a plurality of frequency channels for use in a two-site repeat pattern and a one-site repeat pattern of the cellular communication system, the cellular communication system further comprising neighbouring first and six-sectored sites in which each sector contains at least one frequency channel from the two-site repeat pattern and at least one frequency channel from the one-site repeat pattern, wherein corresponding sectors in each of the neighbouring first and second six-sectored sites have consecutive frequency channels of the two-site repeat pattern and identical frequency channels of the one-site repeat pattern.

Neighbouring sectors within both the first and second six-sectored sites observe a next but one frequency channel relationship with adjacent frequency channels in at least one neighbouring sector for the two-site repeat pattern.

Furthermore, in this overlay/underlay embodiment, it is preferable that a first half of the neighbouring sectors within both the first and second six-sectored sites observe a next but one frequency channel relationship with adjacent frequency channels in at least one neighbouring sector for the one-site repeat pattern and a second half of the neighbouring sectors within both the fist and second six-sectored sites observe a next but three frequency channel relationship with adjacent frequency channels in at least one neighbouring sector for the one-site repeat pattern.

The system of this embodiment of the present invention controls hand-over of a call from the one-site repeat pattern to the two-site repeat pattern in response to a relatively high interference level for the call on the one-site repeat pattern.

In a second aspect of the present invention there is provided a cellular communication system having a frequency bandwidth arranged into a plurality of frequency channels that are distributed on a consecutive frequency channel basis amongst a plurality of frequency groups, the cellular communication system comprising a cluster having neighbouring first and second six-sectored sites, each sector of each site containing a frequency group having at least one frequency channel and wherein: i) the first six-sectored site comprises a first frequency channel and at least five other frequency channels each having an integer multiple next but one frequency channel relationship to the first frequency channel, wherein neighbouring sectors in the first six-sectored site each contain a frequency group having respective frequency channels that observe a next but one frequency channel relationship with frequency channels in at least one neighbouring frequency group; ii) the second six-sectored site comprises a second frequency channel, consecutive in frequency to the first frequency channel, and at least five other frequency channels each having an integer multiple next but one frequency channel relationship to the second frequency channel, wherein neighbouring sectors in the second six-sectored site each contain a frequency group having respective frequency channels that observe a next but one frequency channel relationship with at least one neighbouring frequency group; and iii) consecutive frequency channels of the frequency bandwidth are assigned to corresponding sectors in each of the neighbouring first and second six-sectored sites to produce a two-site re-use pattern for the cluster in which consecutive frequency channels are alternated between the first and second six-sectored sites.

Exemplary embodiments of the present invention will now be described with reference to the accompanying drawings.

DETAILED DESCRIPTION OF PREFERRED EMBODIMENTS

Figure 1:
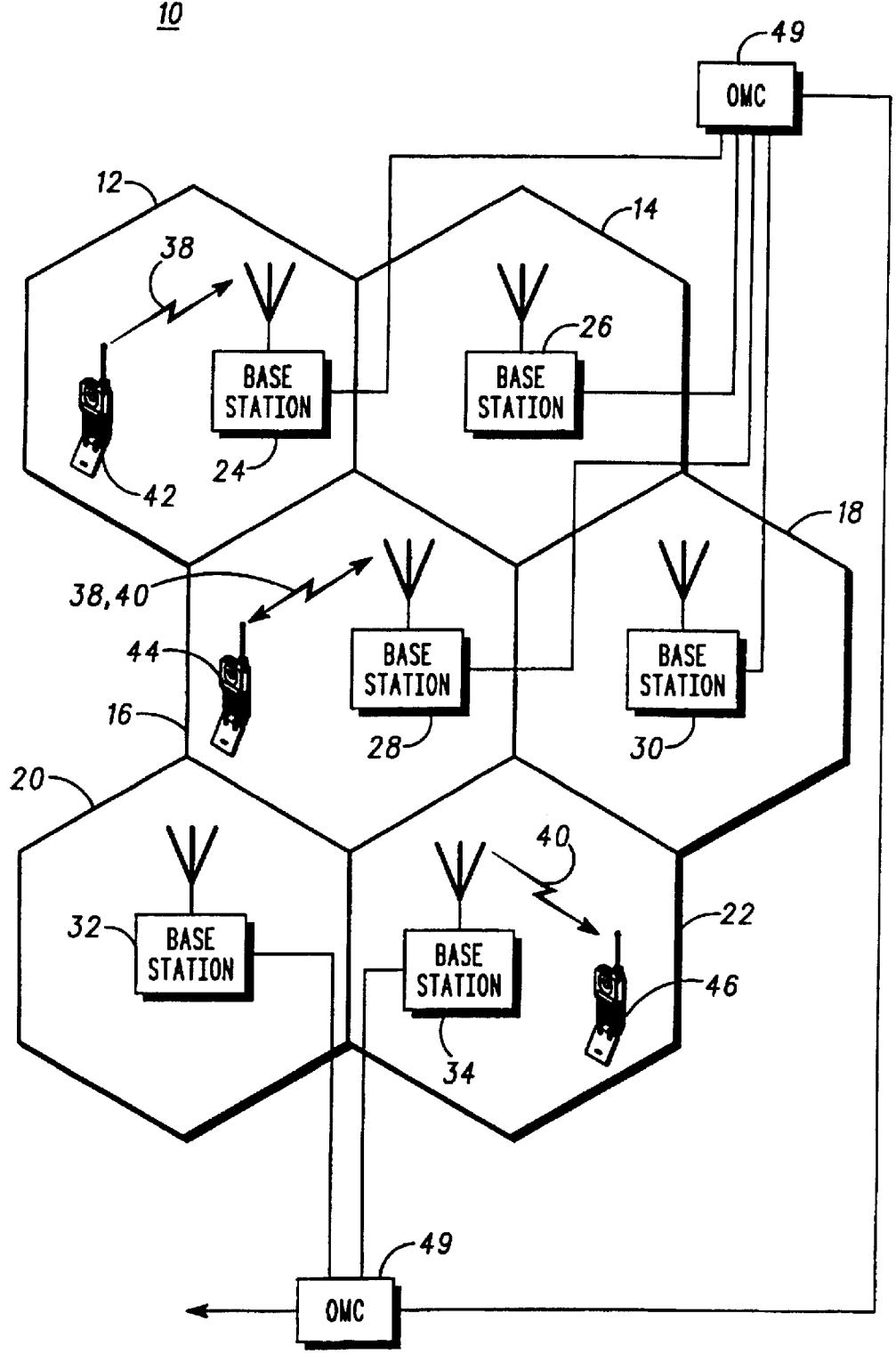
FIG. 1 shows a prior art cellular communication system.

FIG. 1 shows a typical prior art cellular communications system 10 in which a coverage area is defined by a number of sites (or cells) 12–22 represented in conventional hexagonal fashion. Each site 12–22 has a base station 24–34 responsible for controlling communication traffic in the respective site. Typically, the base stations 24–34 will be centrally located, although other positions may be desirable subject to surrounding terrain or propagation conditions. As will be understood, each base station 24–34 may receive 38 and/or transmit 40 signals from/to mobile communication devices 42–46 that roam throughout the communication system 10. Furthermore, each base station (BS) 24–34 is responsive to an operations and maintenance centre (OMC) 49 arranged to have overall system control, which OMC 49 may be either on a regional or system basis (dependent upon the size of the communications system 10).

Figure 2:
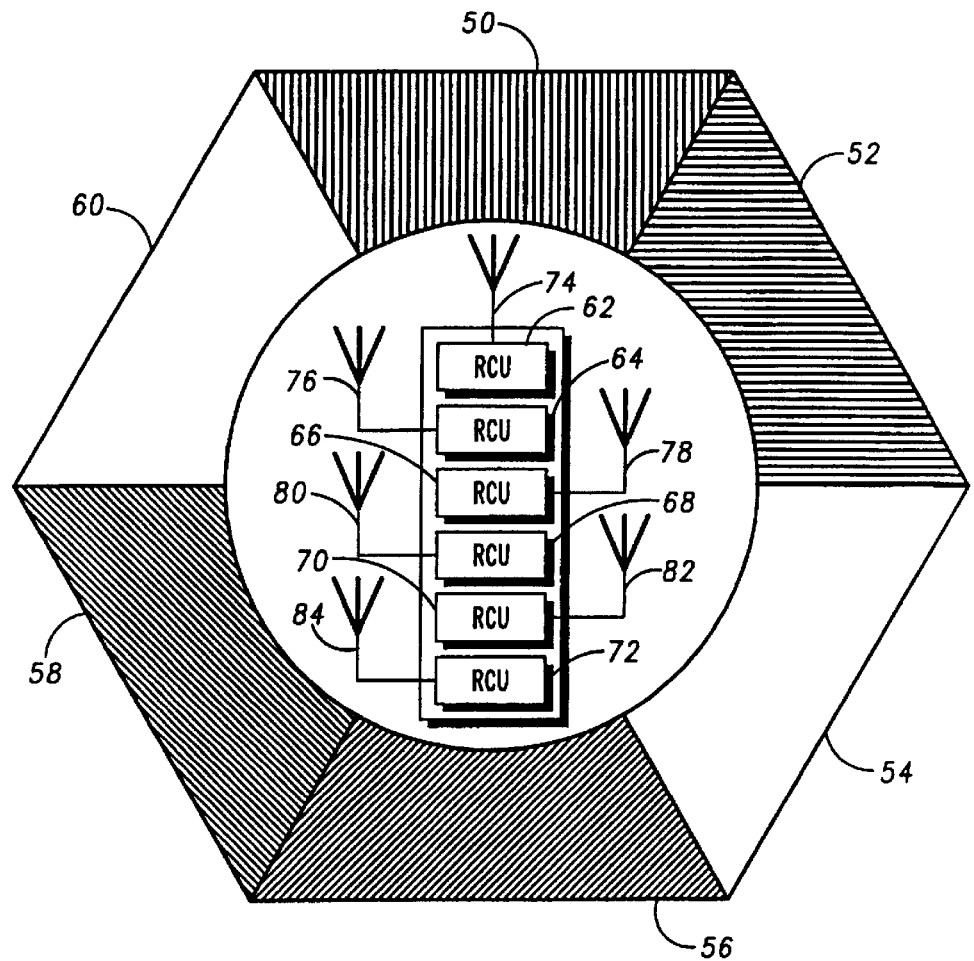
FIG. 2 shows a sectorised site typically utilised in the prior art cellular communication system of FIG. 1.

Each site 12–22 of the cellular communication system 10 of FIG. 1, is typically partitioned into six operational sectors 50–60 (as shown in FIG. 2), with each sector 50–60 serviced by one or more radio channel units (RCUs) 62–72 and associated transmit and/or receive antennas 74–84, respectively. Typically, although not expressly shown, it will be appreciated that some redundancy in the number of RCUs is provided to the site to prevent loss of a sector if failure of a particular RCU occurs. Furthermore, it is usual for Broadcast Control Channels (BCCHs) and Traffic Channels (TCHs) to be served by specific and individual RCUs within each sector. As interference performance in a one-site repeat pattern is relatively high under a fully-loaded system, system load is typically reduced to diminish system interference. As such, cellular systems employing concentric cell arrangements will typically comprise more RCUs that conventional cellular systems.

As previously explained, a cellular communication system has a limited frequency bandwidth 90 (shown in FIG. 3) that is divided into many contiguous frequency channels 91–97 (having equal portions of the available frequency bandwidth). In this respect, coincidence may dictate that the number of frequency channels for the system corresponds to the number of frequency groups, whereby each frequency group contains a solitary channel, however this is seldom the case. Therefore, channels are usually allocated (from a consecutive series of channels) to frequency groups on an incrementing and rotational basis, whereby a first channel 91 is assigned to a first frequency group, a second channel 92 is assigned to a second frequency group, . . . an $n^{th}$ channel 95 is assigned to a final frequency group, an $(n^{th}+1)$ channel 96 is again assigned to the first frequency group, an $(n^{th}+2)$ channel 97 is again assigned to the second frequency group, and so on (in a cyclic fashion) until all available channels for the frequency bandwidth have been assigned to frequency groups. As such, frequency groups need not contain equal numbers of channels. From FIG. 3, the cause of adjacent channel interference (between sectors of cellular communication systems) is represented by boundaries (e.g. 98 and 99) between contiguous frequency channels.

A typical channel assignment protocol is illustrated in TABLE 1 immediately below:

TABLE 1

| Frequency Group | a1 | b1 | c1 | d1 | e1 | f1 |
|---|---|---|---|---|---|---|
| Channel Number | 1, 13 | 2, 14 | 3,15 | 4, 16 | 5, 17 | 6, 18 |
| Frequency Group | a2 | b2 | c2 | d2 | e2 | f2 |
| Channel Number | 7, 19 | 8, 20 | 9, 21 | 10, 22 | 11, 23 | 12, 24 |

It will be noted that TABLE 1 assumes that the frequency bandwidth 90 is sufficient to support 24 channel (carriers), such as Broadcast Control Channels (BCCH).

Figure 4:
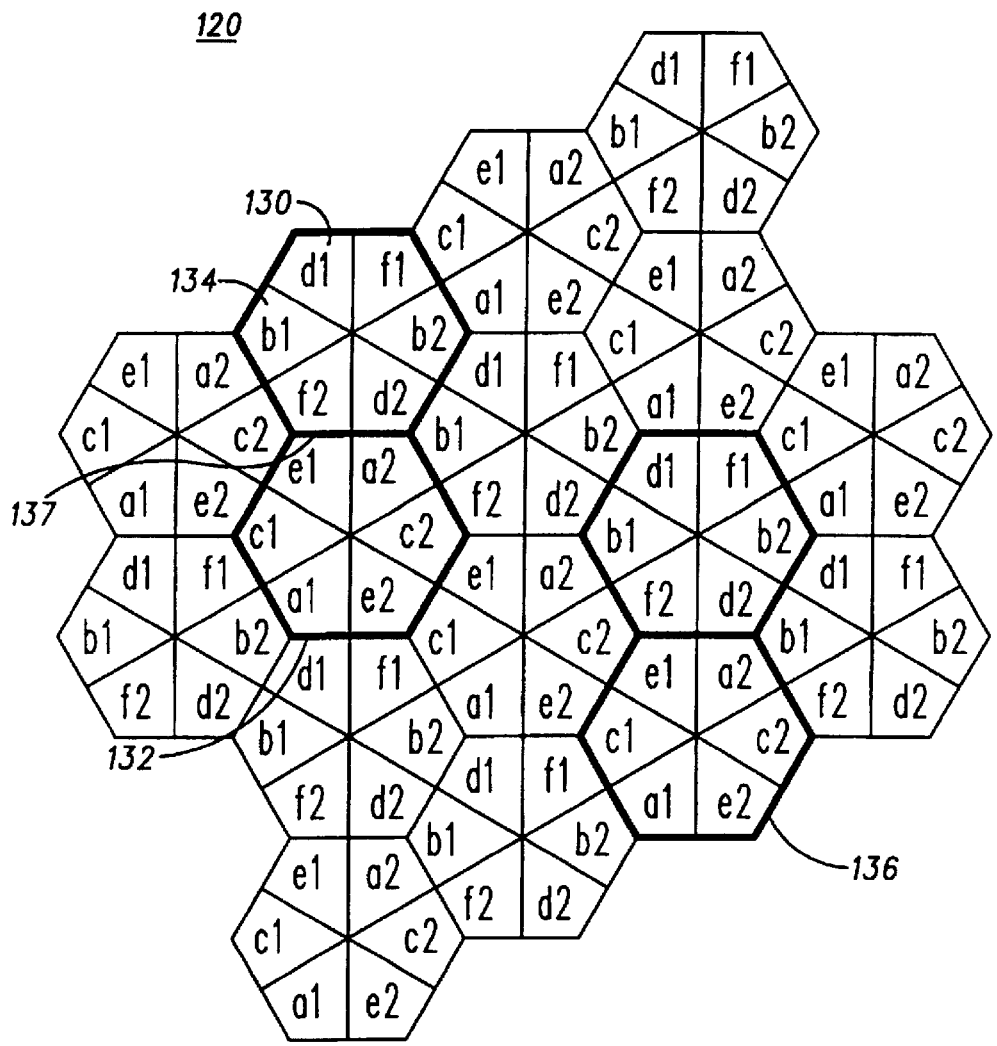
FIG. 4 illustrates a 2-site repeat pattern according to a preferred embodiment of the present invention.

Now, turning to FIG. 4, a preferred embodiment of the present invention produces a two-site repeat (re-use) pattern that optimally balances the co-channel and adjacent channel interference levels. As can be seen, a coverage area 120 is defined by a number of conventionally-represented hexagonal sites (or cells) each having six sectors. Referring to adjacent sites 130 and 132 (which have been outlined in bold to facilitate recognition and which together form a cluster 134 that is repeated to produce a mosaic for the coverage area 120), the total combined number of sectors (namely, twelve sectors) in these two sites each receive a unique frequency group. As such, each cluster requires twelve distinct frequency groups, with the communication system therefore requiring at least twelve distinct (contiguous) channels. Furthermore, in the preferred embodiment, channels are assigned to frequency groups in accordance with the assignment protocol tabulated above. However, it will be appreciated that there need only be a number of frequency channels corresponding to the number of sectors in the cluster 134, i.e. a minimum of twelve frequency channels are required for a cluster having two six-sectored sites. For the sake of illustration, another cluster 136 has been identified and specifically outlined in the coverage area 120 of FIG. 4.

In the preferred embodiment, each site (e.g. site 130) contains a base station and associated infrastructure (not illustrated for the sake of clarity) that is similar to that described in relation to FIGS. 1 and 2, and as will be understood. However, unlike the side-illumination sector coverage provided by each individual RCU of FIG. 2, each RCU for each sector in FIG. 4 is arranged to provide a corner-illumination of its respective sector, whereby each side of the hexagonally represented site is partitioned between frequency groups.

Figure 3:
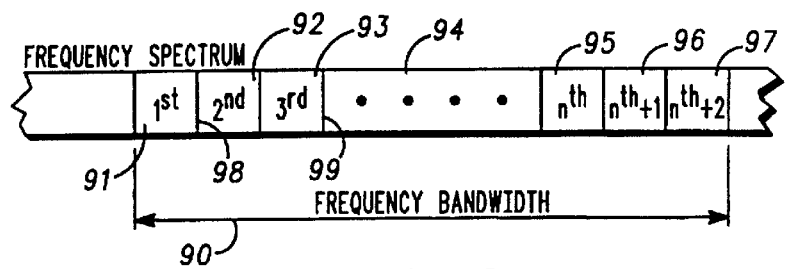
FIG. 3 shows a typical allocation of frequency bandwidth for the prior art cellular communication system of FIG. 1.

With regard to the arrangement of frequency groups (a1–f1 and a2–f2) containing consecutive (and perhaps contiguous) frequency channels of incrementing frequency (as illustrated in FIG. 3 and tabulated in TABLE 1) in each cluster, a first frequency group a1 (having the lowest frequency channel) and a last frequency group f2 (having the highest frequency channel) are nominally disregarded with respect to placement within particular sectors of the cluster (e.g. cluster 134). The remaining frequency groups b1–f1 and a2–e2 are then nominally paired together by associating adjacent frequency groups, i.e. b1 is associated with c1; d1 is associated with e1; f1 is associated with a2; b2 is associated with c2; and d2 is associated with e2.

A first member (the lowest frequency member) of each of these pair of frequency groups is uniquely assigned to a particular sector of a first site (e.g. site 130) of the cluster 134, whereas a second member (the higher frequency member) of each of these pairs of frequency groups is assigned to a corresponding (identically located/positioned) sector of a second site (e.g. site 132) of the cluster 134. Assignment of the frequency group pairings continues on an adjacent and rotational basis such that all first members are assigned to the first site 130 and all second members are assigned to the second site 132, and each first or second member of the pair is side adjacent to at least one other next but one adjacent frequency group, i.e. on a sectorial basis b1 is side adjacent to d1 which is side adjacent to f1 which is side adjacent to b2 which is side adjacent to d2 (in a first site 130), and c1 is side adjacent to e1 which is side adjacent to a2 which is side adjacent to c2 which is side adjacent to e2 (in a second site 132).

By following this frequency group placement pattern, an empty sector that is side adjacent to both b1 and d2 in site 130 appears and, similarly, an empty sector that is side adjacent to both c1 and e2 in site 132 also appears. Therefore, ten of the twelve possible sectors in cluster 134 are filled by the pairings, with the remaining two sectors receiving a pairing of the first frequency group a1 (having the lowest frequency channel) and the last frequency group f2 (having the highest frequency channel). More particularly, the first frequency group a1 is inserted into the empty sector of site 132 such that it is only side adjacent to c1, i.e. a next but one adjacent frequency group. Then, by default, the last frequency group f2 is inserted into the empty sector of site 130 such that it is only side adjacent to d2, i.e. a next but one adjacent frequency group. In this way, an interface 136 between sites of the cluster 134 (or 136) of the preferred embodiment will contain: (a) side adjacencies between (i) frequency group f2 and frequency group d2 (in site 130) and (ii) frequency group e1 and frequency group a2 (in site 132); and (b) half-side adjacencies between (i) frequency group f2 and frequency group e1 (in different sites) and (ii) frequency group d2 and frequency group e2 (also in different sites). As such, each frequency group pairing (containing adjacent channels that could potentially cause splatter if placed side adjacent to each other) is separated by a distance (diameter) of at least one site.

In the new two-site repeat pattern of FIG. 4, no adjacent frequency groups are found within the clusters (134, 136), and adjacent channel interference (splatter) is substantially reduced. However, since the physical separation of co-channel sectors is reduced in comparison with, for example, a four-site use pattern, a carrier-to-interference ratio (C/I) measurement for the co-channel of the preferred embodiment is reduced but nonetheless still provides adequate isolation.

Consequently, the preferred embodiment of the present invention advantageously provides a low-cost, two-site repeat pattern offering low adjacent channel interference and adequate co-channel isolation, while providing the inherent efficiency advantages associated with a reduced repeat pattern.

In an alternate (but less efficient) two-site repeat pattern (shown in FIG. 5), a coverage area 150 again contains a plurality of sites (represented in conventional hexagonal format) each having a base station and associated infrastructure (as will be understood). However, unlike the preferred embodiment in which sectors are corner-illuminated by individual RCUs, each RCU for each sector in FIG. 5 is arranged to provide a side-illumination of its respective sector.

Figure 5:
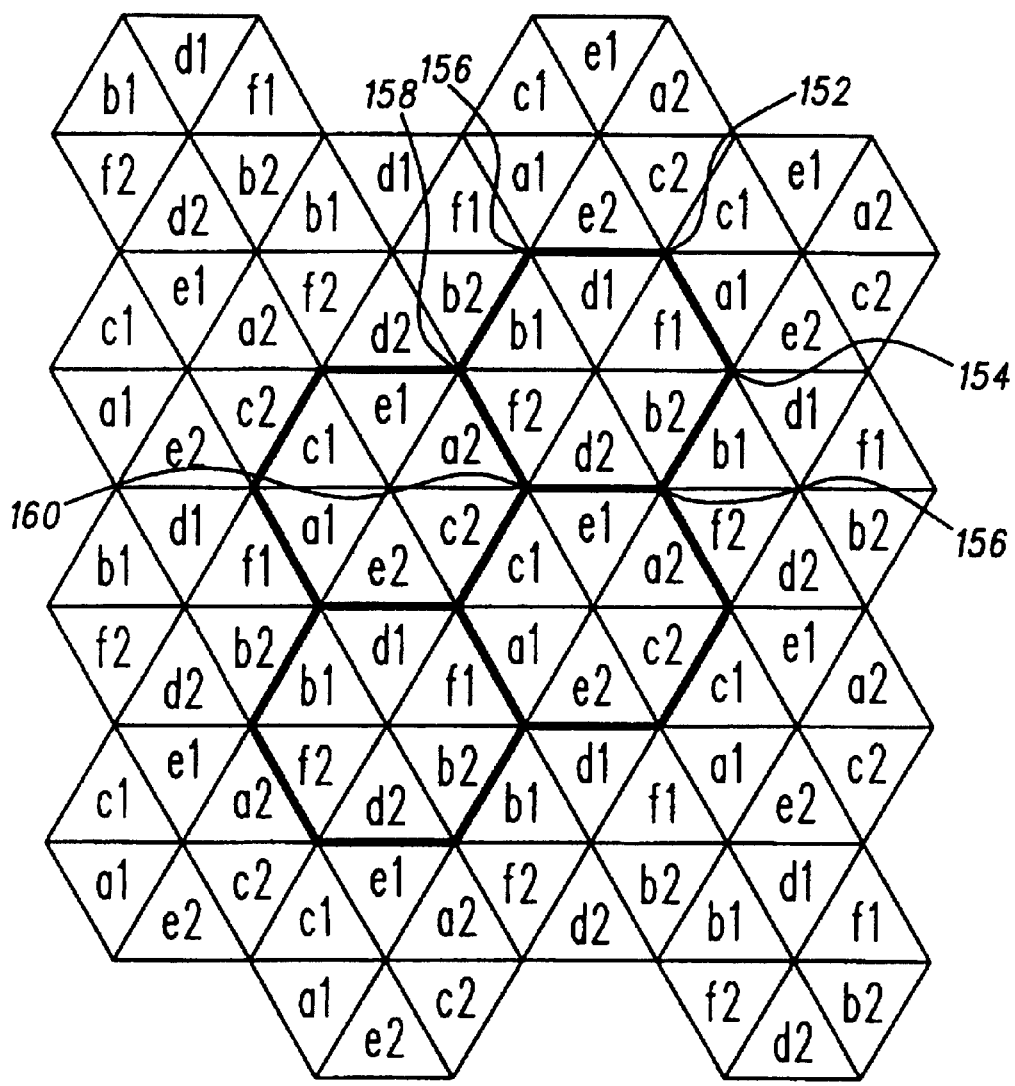
FIG. 5 illustrates a 2-site repeat pattern according to an alternate embodiment of the present invention.

With respect to the arrangement of frequency groups (a1–f1 and a2–f2) in each cluster of FIG. 5, a first frequency group a1 (having the lowest frequency channel) and a last frequency group f2 (having the highest frequency channel) are initially disregarded with respect to placement within particular sectors of a cluster. The remaining frequency groups b1–f1 and a2–e2 are then again nominally paired together by associating adjacent frequency groups, i.e. b1 is associated with c1; d1 is associated with e1; f1 is associated with a2; b2 is associated with c2; and d2 is associated with e2.

The assignment of the frequency group pairings to corresponding sectors in each two-size cluster again occurs in an fashion identical to that previously described for FIG. 4, namely that members of each frequency group pairing are split between sites in the cluster and each first or second member of the pair is then positioned in a sector that is side adjacent to at least one other next but one adjacent frequency group. However, in the side-illuminated configuration of the alternate embodiment, interference points 152–160 (at each corner of every site) appear between adjacent frequency groups, e.g. b1 and a1 or d1 and c1 or d2 and c2, resulting in a lower isolation for adjacent channel splatter (which may be overcome by adhering to strict hand-over regimes between sites, as will be appreciated by the skilled addressee). In this respect, it is noted that the interference experienced at interference points 152–160 in FIG. 5 arises between only two frequency groups (or channels) that potentially interfere at each point. Therefore, hand-off to a base station responsible for any one of the four other non-interfering frequency groups (or channels) that also converge at that interference point could be acceptable.

In summary, a cellular communication system (configured as described immediately above) has a frequency bandwidth arranged into a plurality of frequency channels that are allocated on a consecutive frequency basis to corresponding sectors in each of neighbouring first and second sites. The present invention may be employed with any cellular communication system, such as time-division multiplexed systems (including those capable of supporting frequency hopping, if desired).

With respect to a cellular communication system configured to support an underlay/overlay frequency re-use, a typical channel assignment protocol is illustrated in TABLE 2 immediately below:

TABLE 2

| Frequency Group | b1 | b2 | b3 | b4 | b5 | b6 |
|---|---|---|---|---|---|---|
| Channel Number | 1, 19 | 2, 20 | 3, 21 | 4, 22 | 5, 23 | 6, 24 |
| Frequency Group | b7 | b8 | b9 | b10 | b11 | b12 |
| Channel Number | 7 | 8 | 9 | 10 | 11 | 12 |
| Frequency Group | t1 | t2 | t3 | t4 | t5 | t6 |
| Channel Number | 13 | 14 | 15 | 16 | 17 | 18 |

It will be noted that TABLE 2 assumes that the frequency bandwidth 90 (of FIG. 3) is sufficient to support 24 channels (carriers).

Figure 6:
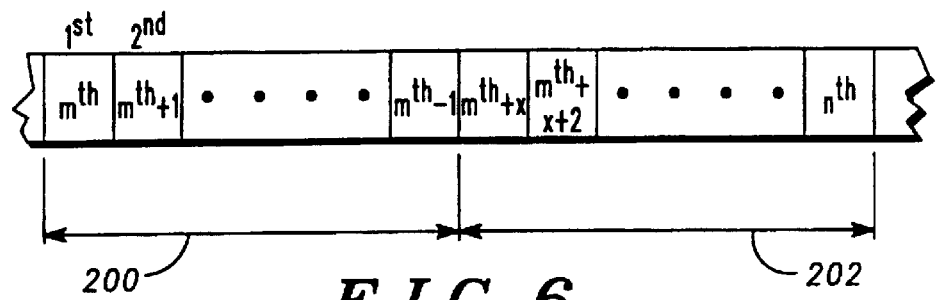
FIG. 6 shows a typical allocation of frequency bandwidth for a prior art cellular communication system that utilises a concentric cell pattern.

In the context of a cellular communication system employing concentric cells, FIG. 6 shows a typical allocation of frequency bandwidth. In this particular instance, a first group (typically containing a plurality of frequency channels) 200 is assigned for use in a first repeat pattern, whereas a second group (containing a different plurality of frequency channels) 202 is assigned for use in a second repeat pattern. For example, the group 200 may be BCCHs, whereas the second group 202 may be TCHs. Moreover, although an actual number of channels in each of the groups (200 and 202) may be the same, it is likely that a greater number of channels will be assigned to the more frequently (smaller) repeated pattern in order to avoid interference as far as possible, as will be understood.

Indeed, frequency groups used for BCCHs will probably contain a single frequency channel, while frequency groups used for TCHs will probably contain multiple frequency channels.

It will of course be appreciated that FIG. 6 represents one particular allocation scheme, and that the allocation of frequency channels need only satisfy cell planning requirements (with respect to carrier interference) for frequency groups within the cellular system. For example, frequency channels may be assigned to the different repeat patterns on a rotational basis, whereby a specified number of consecutive (potentially contiguous) frequency channels are allocated to the first group before the remaining frequency channels are allocated (on another rotational basis) to the second group, as illustrated in TABLE 3 below:

TABLE 3

| Frequency Group | t1 | t2 | t3 | t4 | t5 | t6 |
|---|---|---|---|---|---|---|
| Channel Number | 1, 7 | 2, 8 | 3, 9 | 4, 10 | 5, 11 | 6, 12 |
| Frequency Group | b1 | b2 | b3 | b4 | b5 | b6 |
| Channel Number | 13 | 14 | 15 | 16 | 17 | 18 |
| Frequency Group | b7 | b8 | b9 | b10 | b11 | b12 |
| Channel Number | 19 | 20 | 21 | 22 | 23 | 24 |

Figure 7:
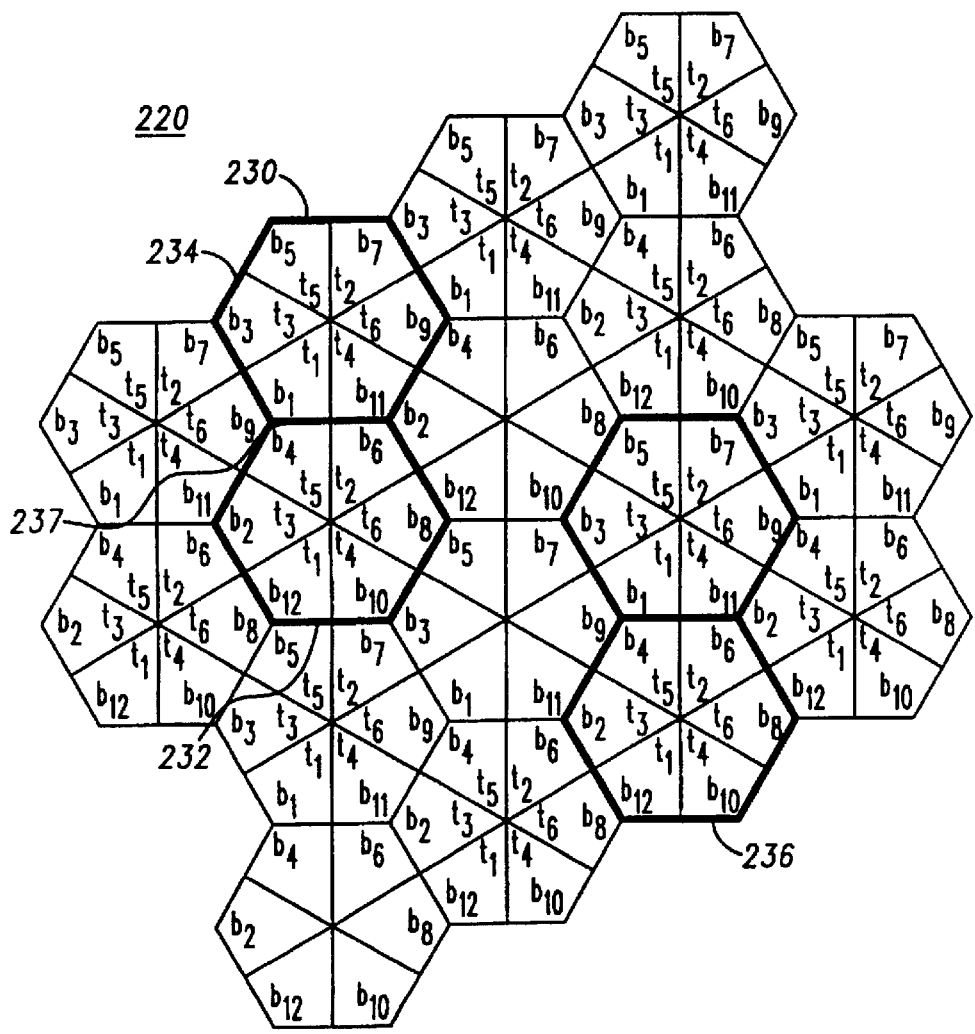
FIG. 7 illustrates a two-site repeat pattern with a one-site underlay/overlay repeat scheme according to another embodiment of the present invention.

Turning to FIG. 7, another embodiment of the present invention produces a two-site repeat (re-use) pattern with a one-site underlay/overlay repeat scheme that optimally balances the co-channel and adjacent channel interference levels. As can be seen, a coverage area 220 is defined by a number of conventionally-represented hexagonal sites (or cells) each having six sectors. As will be appreciated, this hexagonal topography has the advantage of keeping interference relatively low. Now, referring to adjacent sites 230 and 232 (which have been outlined in bold to facilitate recognition and which together form a cluster 234 that is repeated to produce a mosaic for the coverage area 220), it can be seen that eighteen distinct frequency groups have been distributed between the twelve sectors. More specifically, the eighteen frequency groups (each of which may contain one or more frequency channels) are attributed to either a two-site (by six-sector) repeat pattern or a one-site (by six-sector) repeat pattern, with the two-site repeat pattern receiving twelve of the frequency groups (b1–b2) and the one-site repeat pattern receiving the remaining six frequency groups (t1–t6). Furthermore, in this embodiment, frequency groups b1–b12 are nominally BCCHs, while frequency groups t1–t6 are nominally TCHs. For the sake of illustration, another cluster 236 has been identified and specifically outlined in the coverage area 220 of FIG. 7.

Each site (e.g. site 230) contains a base station and associated infrastructure (not illustrated for the sake of clarity) that is similar to that described in relation to FIGS. 1 and 2, and as will be understood. However, unlike the side-illumination sector coverage provided by each individual RCU of FIG. 2, each RCU for each sector in FIG. 7 is arranged to provide a corner-illumination of its respective sector, whereby each side of the hexagonally represented site is partitioned between frequency groups.

With regard to the arrangement of frequency groups b1–b2 (containing consecutive and potentially contiguous frequency channels of incrementing frequency) in the two-site repeat pattern of cluster 234, a first frequency group b1 (having the lowest frequency channel) and a last frequency group b12 (having the highest frequency channel) are nominally disregarded with respect to placement within particular sectors of the cluster (e.g. cluster 234). The remaining frequency groups b2–b11 are then nominally paired together by associating adjacent frequency groups, i.e. b2 is associated with b3; b4 is associated with b5; b6 is associated with b7; b8 is associated with b9; and b10 is associated with b12.

A first member (the lowest frequency member) of each of these pairs of frequency groups is uniquely assigned to a particular sector of a first site (e.g. site 230) of the cluster 234, whereas a second member (the higher frequency member) of each of these pairs of frequency groups is assigned to a corresponding (identically located/positioned) sector of a second site (e.g. site 232) of the cluster 234. Assignment of the frequency group pairings continues on an adjacent and rotational basis such that all first members are assigned to the first site 230 and all second members are assigned to the second site 232, and each first or second member of the pair is side adjacent to at least one other next but one adjacent frequency group, i.e. on a sectorial basis b3 is side adjacent to b5 which is side adjacent to b7 which is side adjacent to b9 which is side adjacent to b11 (in a first site 230), and b2 is side adjacent to b4 which is side adjacent to b6 which is side adjacent to b8 which is side adjacent to b10 (in a second site 232).

By following this frequency group placement pattern, an empty sector that is side adjacent to both b3 and b11 in site 230 appears and, similarly, an empty sector that is side adjacent to both b2 and b10 in site 232 also appears. Therefore, ten of the twelve possible sectors in cluster 234 are filled by the pairings, with the remaining two sectors receiving a pairing of the first frequency group b1 (having the lowest frequency channel) and the last frequency group b12 (having the highest frequency channel). More particularly, the first frequency group b1 is inserted into the empty sector of site 230 such that it is only side adjacent to b3, i.e. a next but one adjacent frequency group. Then, by default, the last frequency group b12 is inserted into the empty sector of site 232 such that it is only side adjacent to b10, i.e. a next but one adjacent frequency group. In this way, an interface 237 between sites of the cluster 234 (or 236) of this particular configuration will contain: (a) side adjacencies between (i) frequency group b1 and frequency group b11 (in site 230) and (ii) frequency group b4 and frequency group b6 (in site 232); and (b) half-side adjacencies between (i) frequency group b1 and frequency group b5 (in different sites) and (ii) frequency group b11 and frequency group b6 (also in different sites). As such, each frequency group pairing (containing adjacent channels that could potentially cause splatter if placed side adjacent to each other) is separated by a distance (diameter) of at least one site.

Having regard to the one-site underlay/overlay of the remaining six frequency groups t1–t6, each sector of each site contains one of these frequency groups (and hence one or some traffic frequency channels), with corresponding sectors in adjacent site containing the same particular frequency group. The frequency groups t1–t6 are cyclically arranged in the sectors of sites 230 and 232, for example, on the following adjacent basis: t1 is adjacent to t3 which is adjacent to t5 which is adjacent to t2 which is adjacent to t6 which is adjacent to t4 which is adjacent to t1. Therefore, a next but one frequency group (and hence frequency channel) relationship with at least one adjacent sector exists between half of the adjacent frequency (TCH) groups in a site. Furthermore, the interleaving of frequency groups t2, t6 and t4 (in a next but three frequency channel relationship) is necessitated by the need to avoid adjacent channel interference in the one-site repeat pattern.

In overview of each cluster of FIG. 7, no adjacent frequency groups are found within the two-site repeat pattern, and adjacent channel interference (splatter) in the two-site repeat pattern is substantially reduced. However, since the physical separation of co-channel sectors is reduced in comparison with, for example, a four-site use pattern, a carrier-to-interference ratio (C/I) measurement for the co-channel of this particular embodiment is reduced but nonetheless still provides adequate isolation. With regard to the one-site underlay, no adjacent boundaries between frequency groups t1–t6 can be found within a site, while co-channel interference between frequency groups t1–t6 at the periphery of each sector within a site can be ignored because the this embodiment of the present invention contemplates the implementation of a hand-over (orchestrated principally by the base station in response to mobile unit or base-station determined measurements known in the art) from the frequency groups of the one-site (TCH) repeat pattern to the frequency groups two-site (BCCH) repeat pattern. More specifically, once a call on a TCH carrier suffers from unacceptably high interference, the call will be handed over to the channels available on the co-sited BCCH. As such, this particular embodiment of the present invention utilises an optimal intra-cell hand-over algorithm to reduce overall "outrage" and to therefore maintain a relatively high quality of service. Indeed, it can be seen that the "outage" (i.e. a predefined threshold for the signal to interference ratio) for the one-site repeat pattern is greater that the outage of the BCCH two-site repeat pattern because the distance between co-channels in the one-site repeat pattern is only one site (cell) diameter.

Therefore, this underlay/overlay configured embodiment of the present invention advantageously provides a low-cost, two-site repeat pattern with one-site overlay/underlay offering low adjacent channel interference (because no adjacent channels on the same site share a common boundary) and adequate co-channel isolation, while providing the inherent efficiency advantages associated with a reduced repeat pattern. Moreover, the two-layer scheme that arises from the differing topographies of the underlaid/overlaid configuration provides an increased trunking efficiency in that more carriers are allocated to each site, and an improved (higher) in-building signal penetration that arises because of an ability to implement a narrower antenna beamwidth for the hexagonal cell-structure of the present invention (rather than a relatively wide antenna beamwidth for a three-sector site), as will be understood by the skilled addressee.

In an alternate (but less efficient) two-site repeat pattern having a one-site underlay/overlay scheme (shown in FIG. 8), a coverage area 250 again contains a plurality of sites (represented in conventional hexagonal format) each having a base station and associated infrastructure (as will be understood). However, unlike the corner-illuminated sectors of the previously described underlaid/overlaid configuration, each RCU for each sector in FIG. 8 is arranged to provide a side-illumination of its respective sector.

Figure 8:
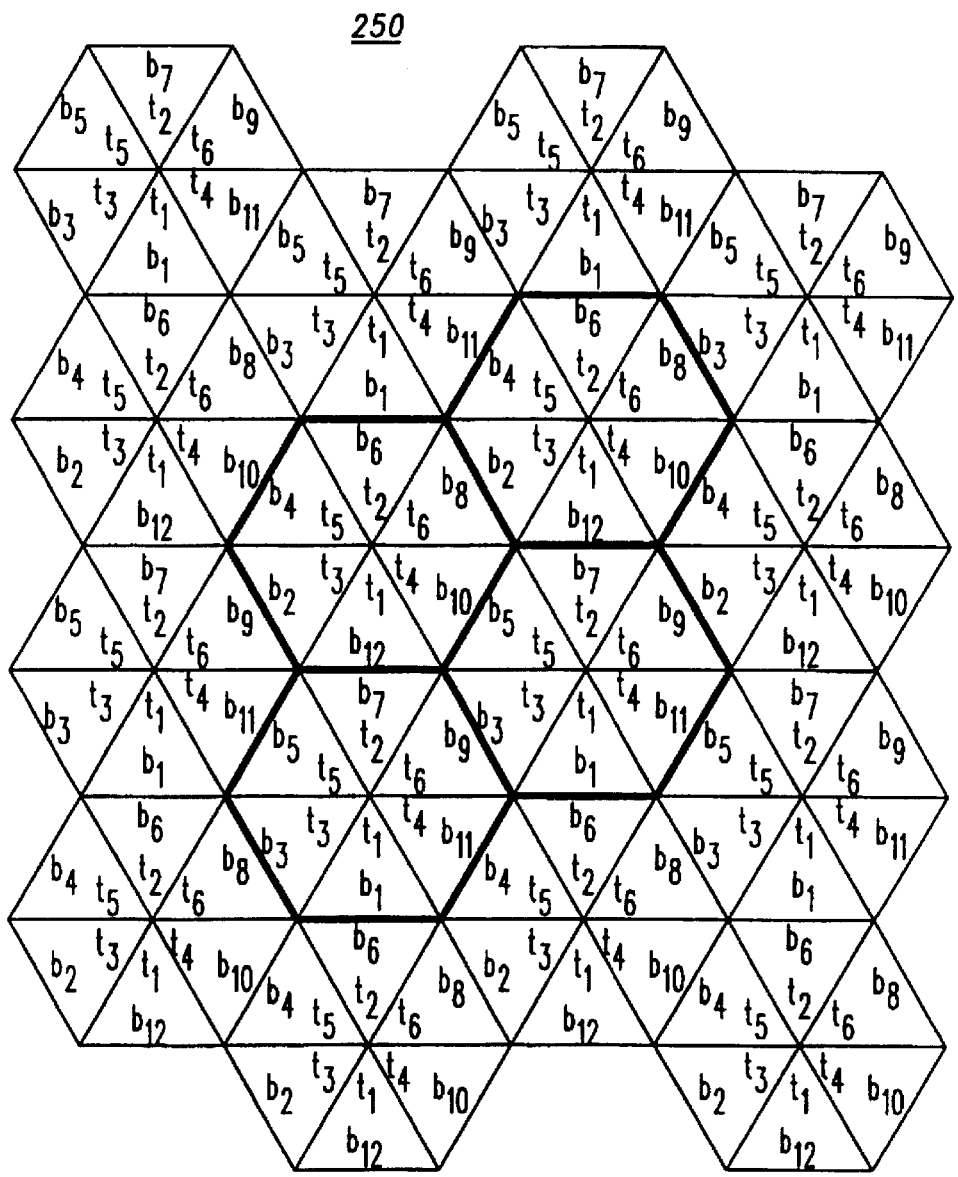
FIG. 8 illustrates a two-site repeat pattern with a one-site underlay/overlay repeat scheme according to a further embodiment of the present invention.

With respect to the arrangement of frequency groups (b1–b12 and t1–t6) in each cluster of FIG. 8, a first frequency group b1 (having the lowest frequency channel) and a last frequency group b12 (having the highest frequency channel) are initially disregarded with respect to placement within particular sectors of a cluster. The remaining frequency groups b2–b11 are then again nominally paired together by associating adjacent frequency groups, i.e. b2 is associated with b3; b4 is associated with b5; b6 is associated with b7; b8 is associated with b9; and b10 is associated with b11.

The assignment of the frequency group pairings to corresponding sectors in each two-site cluster again occurs in an fashion identical to that previously described for FIG. 7, namely that members of each frequency group pairing are split between sites in the cluster and each first or second member of the pair is then positioned in a sector that is side adjacent to at least one other next but one adjacent frequency group. However, in the side-illuminated configuration of this alternate underlaid/overlaid embodiment, interference points (at each corner of every site) appear between adjacent frequency groups, e.g. b4 and b3 or b10 and b9 or b6 and b5, resulting in a lower isolation for adjacent channel splatter (which may be overcome by adhering to strict hand-over regimes between sites, as will be appreciated by the skilled addressee). In this respect, it is noted that the interference experienced at interference points in FIG. 8 arises between only two frequency groups (or channels) that potentially interfere at each point. Therefore, hand-off to a base station responsible for any one of the four other non-interfering frequency groups (or channels) that also converge at that interference point could be acceptable.

Frequency groups t1–t5 (in the one-site overlay/underlay repeat pattern) are assigned in an identical way to that previously described in relation to FIG. 5, so recitation has been ignored for the sake of brevity.

It will, of course, be understood that the above description has been given by way of example only and that modifications in detail, such as the orientation of each cluster and the rotational assignment of each frequency group pairing to particular but corresponding sectors in each cluster, may be made within the scope of the present invention. Furthermore, with respect to an available frequency bandwidth for the communication system, this may be constructed from two or more separate blocks of spectrum, in which blocks have some channels that have frequencies contiguous to one another. Additionally, since the one-site overlay/underlay offers increased capacity, not all sites in the system need contain this overlay/underlay scheme. For example, sites in rural areas may adequately cope with communication traffic using the two-site repeat pattern only. As such, it is envisaged that the one-site (overlay/underlay) repeat pattern may be selectively applied to areas of specific need within the cellular communication system. Furthermore, the present invention may be employed with any cellular communication system, such as time-division multiplexed systems (including those capable of supporting frequency hopping, if desired).

What is claimed is:

1. A cellular communication system having a frequency bandwidth arranged into a plurality of frequency channels, the cellular communication system comprising neighbouring first and second sites each having sectors containing at least one frequency channel comprising a frequency group, wherein corresponding sectors in each of the neighbouring first and second sites have consecutive frequency channels from the frequency bandwidth forming the frequency groups, the frequency bandwidth arranged into the plurality of frequency channels for use in a two-site repeat pattern (b1–b12) and a one-site repeat pattern (t1–t6) of the cellular system further comprising those neighbouring first and second six-sectored sites in which each sector contains at least one frequency channel from the two-site repeat pattern and at least one frequency channel from the one-site repeat pattern, wherein the corresponding sectors in each of the neighboring first and second six-sectored sites have consecutive frequency channels of the two-site repeat pattern and identical frequency channels of the one-site repeat pattern.

2. The cellular communication system according to claim 1, wherein neighbouring sectors within both the first and second sites observe a next but one frequency channel relationship with adjacent frequency channels in at least one neighbouring sector.

3. The cellular communication system according to claim 1 or 2, wherein the first and second sites are corner-illuminated sites.

4. The cellular communication system according to claim 1 or 2, wherein the first and second sites are side-illuminated sites.

5. The cellular communication system according to claim 1, wherein neighbouring sectors within both the first and second six-sectored sites observe a next but one frequency channel relationship with adjacent frequency channels in at least one neighbouring sector for the two-site repeat pattern.

6. The cellular communication system according to claim 1, wherein a first half to he neighbouring sectors within both the first and second six-sectored sites observe a next but one frequency channel relationship with adjacent frequency channels in at least one neighbouring sector for the one-site repeat pattern and a second half of the neighbouring sectors within both the first and second six-sectored sites observe a next but three frequency channel relationship with adjacent frequency channels in at least one neighbouring sector for the one-site repeat pattern.

7. The cellular communication system according to claim 1, wherein the two-site repeat pattern overlays the one-site repeat pattern.

8. The cellular communication system according to claim 6, further comprising means for controlling hand-over of a call from the one-site repeat pattern to the two-site pattern in response to a relatively high interference level for the call on the one-site repeat pattern.

9. The cellular communication system according to claim 1, wherein the plurality of frequency carriers are allocated to the one-site repeat pattern and the two-site repeat pattern on a cyclic basis.

10. The cellular communication system according to claim 1, wherein the frequency channels of the two-site repeat pattern are BCCHs and the frequency channels of the one-site repeat pattern are TCHs.

11. A cellular communication system having a frequency bandwidth arranged into a plurality of frequency channels that are distributed on a consecutive frequency channel basis amongst a plurality of frequency groups the cellular communication system comprising a cluster having neighbouring first and second six-sectored sites, each sector of each site containing a frequency group having at least one frequency channel and wherein:

the first six-sectored site comprises a first frequency channel and at least five other frequency channels each having an integer multiple next but one frequency channel relationship to the first frequency channel, wherein neighbouring sectors in the first six-sectored site each contain a frequency group having respective frequency channels that observe a next but one frequency channel relationship with frequency channels in at least one neighbouring frequency group;

the second six-sectored site comprises a second frequency channel, consecutive in frequency to the first frequency channel, and at least five other frequency channels each having an integer multiple next but one frequency channel relationship to the second frequency channel, wherein neighbouring sectors in the second six-sectored site each contain a frequency group having respective frequency channels that observe a next but one frequency channel relationship with at least one neighbouring frequency group; and consecutive frequency channels of the frequency bandwidth are assigned to corresponding sectors in each of the neighbouring first and second six-sectored sites to produce a two-site re-use pattern for the cluster in which consecutive frequency channels are alternated between the first and second six-sectored sites.

12. The cellular communication system according to claim 11, wherein at least one frequency group contains more than one carrier frequency obeying the integer multiple next but one frequency channel relationship.

13. The cellular communication system according to claim 12, wherein the plurality of frequency carriers are allocated to the frequency groups on a cyclic basis.

14. The cellular communication system according to claim 11, 12 or 13, wherein the first and second six-sectored sites are corner-illuminated sites.

* * * * *

UNITED STATES PATENT AND TRADEMARK OFFICE
CERTIFICATE OF CORRECTION

PATENT NO. : 6,212,385 B1
DATED : April 3, 2001
INVENTOR(S) : Thomas et al.

It is certified that error appears in the above-identified patent and that said Letters Patent is hereby corrected as shown below:

Column 11,
Line 30, reads "1 or 2"; should read -- 1 --
Line 33, reads "1 or 2"; should read -- 1 --

Signed and Sealed this

Ninth Day of October, 2001

Attest:

NICHOLAS P. GODICI
Attesting Officer
Acting Director of the United States Patent and Trademark Office